United States Patent [19]
Takada

[11] 3,882,456

[45] May 6, 1975

[54] FAULT-DETECTING SYSTEM FOR A MULTI-CHANNEL RELAY SYSTEM

[75] Inventor: Masami Takada, Tokyo, Japan

[73] Assignee: Nippon Electric Company, Ltd., Tokyo, Japan

[22] Filed: Dec. 10, 1973

[21] Appl. No.: 423,613

Related U.S. Application Data

[63] Continuation-in-part of Ser. No. 326,191, Jan. 24, 1973, abandoned.

[30] Foreign Application Priority Data

Jan. 26, 1972 Japan .............................. 47-10027

[52] U.S. Cl............ 340/146.1 R; 179/69 G; 325/41

[51] Int. Cl. ............................................. H04l 1/00

[58] Field of Search............ 340/146.1 R; 178/69 G; 325/41

[56] References Cited

UNITED STATES PATENTS

| | | | |
|---|---|---|---|
| 3,456,191 | 7/1969 | Rodenburg et al. | 325/41 X |
| 3,500,319 | 3/1970 | Van Duuren et al. | 340/146.1 |
| 3,553,369 | 1/1971 | Flohrer | 178/69 G |
| 3,731,203 | 5/1973 | Lieberman | 178/69 G |

*Primary Examiner*—Malcolm A. Morrison
*Assistant Examiner*—David H. Malzahn
*Attorney, Agent, or Firm*—Sughrue, Rothwell, Mion, Zinn & Macpeak

[57] ABSTRACT

In a digital transmission system for transmitting in parallel a plurality of information channels, and including a plurality of relay stations, a technique for detecting faults and particularly for distinguishing between faults in individual channels and a fault common to all channels which may arise due to rainfall attenuation. The method involves determining a first fault threshold level which is proportional to the level of interfering signals on a channel caused by the signals on neighboring channels and a second fault threshold level proportional to the level of noise signals on a channel resulting from channel components. At at least one relay station, a monitoring signal is developed for each channel which is representative of the level of the incoming signal to the relay station for the corresponding channel and the level of the monitoring signal is compared to the first and second threshold levels. If the monitoring signal level falls below the first threshold level, it is an indication of a single channel fault. If it is determined that the levels of the monitoring signals on all the channels fall below the first threshold level, it is an indication of a common fault to all of the channels. If only a single channel fault is determined, the incoming channel signal is switched to a standby channel. If, on the other hand, a common fault to all of the channels is determined, a switch-over to an alternate route is effected when the monitoring signal level falls below the second threshold signal level. Apparatus for developing the monitoring signals, for comparing the monitoring signals with the threshold levels and for effecting the appropriate switch-overs are described.

4 Claims, 7 Drawing Figures

C

FAULT-DETECTING SYSTEM FOR A MULTI-CHANNEL RELAY SYSTEM

CROSS-REFERENCE TO RELATED APPLICATION

This application is a Continuation-in-Part of co-pending application Ser. No. 326,191 filed Jan. 24, 1973, by Masami Takada for "Fault-Detecting System for a Multi-Channel Relay System" now abandoned.

BACKGROUND OF THE INVENTION

1. Field of the Invention

This invention relates to a fault-detecting system for a multichannel relay system having a plurality of communication channels arranged in parallel in a microwave telecommunication system employing frequency-division multiplexing, polarization-division multiplexing, and the like. The present system is applicable particularly to those microwave relay systems which are adapted to the transmission of digital signals.

2. Description of the Prior Art

In a microwave relay communications system, one or a plurality of stand-by channels are always provided in parallel with a plurality of in-operation channels. As soon as any malfunction is detected at the inoperation channels, switch-over is performed from the in-operation channels to the stand-by channels so as to avoid interruption of communication.

In the past, microwave relay systems have been in use for the transmission of analog signals such as telephone and television signals. In those cases, the malfunction is usually detected by the use of a pilot signal detector and a noise level detector. However, this technique is applicable only to those cases where the signals under transmission are analog signals.

For a digital signal transmission, the malfunction may be detected through the detection of the error rate in codewords. However, the means for the error rate detection is not economical to include in the microwave relay system adapted to digital signal transmission.

SUMMARY OF THE INVENTION

It is therefore the object of the present invention to provide a malfunction-detection system for a microwave relay system adapted to digital signal transmission.

BRIEF DESCRIPTION OF THE DRAWINGS

The present invention will now be described in conjunction with the accompanying drawings in which.

DESCRIPTION OF THE PREFERRED EMBODIMENT

Figure 1:
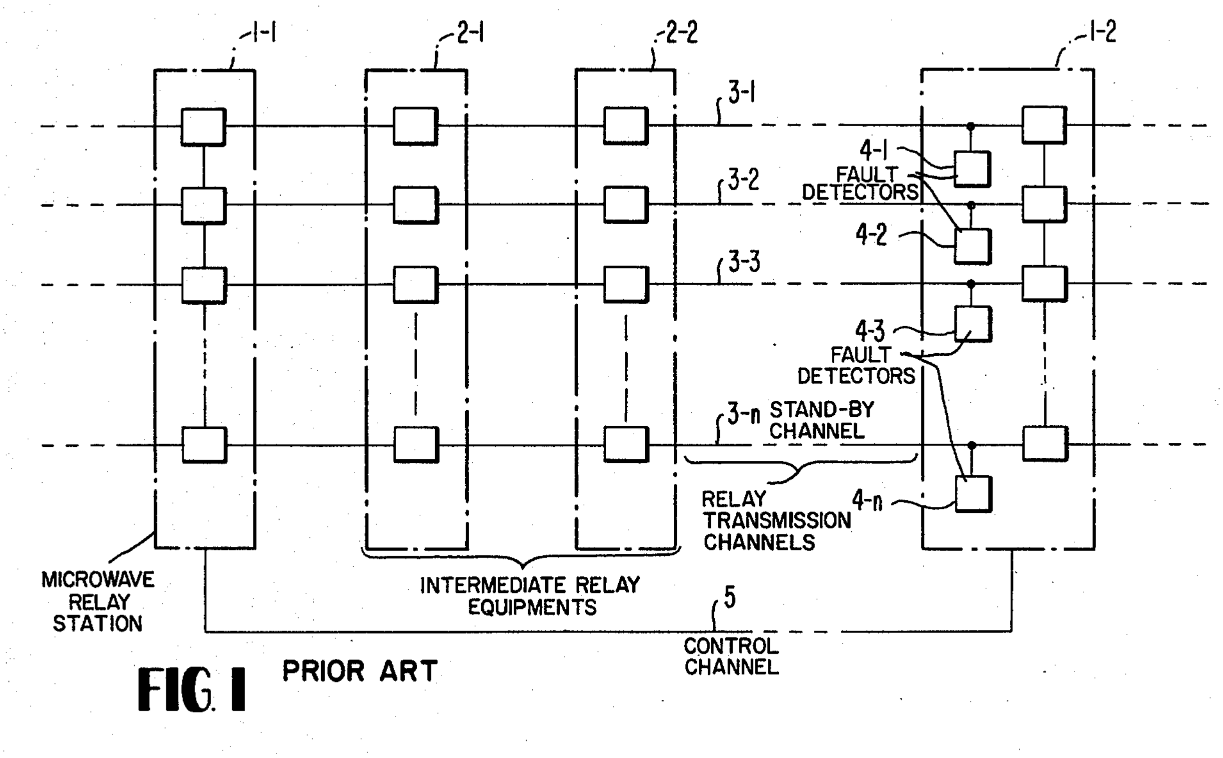
FIG. 1 is a schematic diagram showing a conventional fault-detecting system for use in a microwave relay system having a plurality of parallel frequency division channels.

In FIG. 1, reference numerals 1-1, 1-2, 2, —represent microwave relay stations capable of route switch-over; 2-1, 3-2, —, intermediate relay equipment spaced apart from each other and from stations 1-1 and 1-2; 3-1,3-2, —**3-*n*, relay transmission channels arranged in parallel using separate carrier waves of mutually different frequencies; and, 4-1, 4-2, —4-*n***, fault detectors.

It will be assumed that the transmission channel **3-*n* is a stand-by channel, with the rest serving as in-operation channels, and that the carrier waves are transmitted from station 1-1 to station 1-2. Generally, there are two different types of malfunctions which the relay systems tend to suffer, i.e., the whole-channel fault and individual channel fault. In the former case, the transmission channels may be switched over to stand-by channels on another route (not shown) by the use of such techniques as the so-called route diversity whereby the transmission faults of all the channels in one transmission route can be relieved by switching to the channels of the other transmission route, while in the latter, only the individual faulty channel is switched over to a stand-by channel. For example, if trouble develops in channel 3-2 at the intermediate relay equipment 2-1, abnormally lowering the incoming signal level viewed at another intermediate relay equipment 2-2, that trouble can be detected by detecting the noise level or a pilot signal level using a fault detector 4-2 provided for the channel 3-2. Then the relay amplifier for channel 3-2 provided at the station 1-1 is controlled through control channel 5, which is for sending a control signal back to the station 1-1, so that the channel 3-2 may be switched at the station 1-1 over to one of the stand-by channels 3-*n*. The carrier wave thus transmitted through the channel 3-*n* in the region lying between the stations 1-1 and 1-2 is switched back to the channel 3-2 at the station 1-2 for further transmission. Alternatively, the signal of the channel 3-2 may be transmitted through both the channels 3-2 and 3-*n*, at the station 1-1, and thus permitting the selection of one of them at the station 1-2**.

In some cases, fault detection may be achieved by detecting the presence or absence of the output at the *i-f* amplifier or relay transmitter individually provided for respective channels at the stations 1-1 and 1-2 and relay equipment 2-1 and 2-2. The result of such detection may be in the form of a mere alarm signal for permitting maintenance personnel to carry out the switch-over.

So far as the fault detection depends on an analog pilot signal as in the case of the above-mentioned conventional systems, the fault detection through the pilot signal level detection is not very hard to achieve and is rather effective.

However, the technique is not directly applicable to a digital signal transmision. In place of the incoming pilot signal, the code error rate must be detected. To meet this requirement, a digital pilot signal must be inserted at the station 1-1 and detected at the station 1-2 to determine the code error rate. The insertion and detection of the digital pilot signal involves synchronization, pulse-stuffing and other signal processing, for which complicated pulse handling circuits are needed. It is therefore not economical to employ a number of such complicated circuits at each of the relay stations and relay equipment.

The conventional method of detecting an abnormal drop in signal level at the intermediate frequency amplifier stage or at the final power amplifier stage for the purpose of fault detection is simple and easy to apply. However, it is not applicable to the fault detection of digital-signal-modulated microwave relay systems in which a plurality of microwave-frequency channels are provided with very small frequency spacings therebetween for the transmission of a great amount of digital information and in which the incoming signal level at a receiving end tends to vary widely with the normal communications kept in progress even while the level of interference among the adjacent carrier waves is high. The reason for this is that the level lowering in the intermediate frequency amplifier output, for example, cannot be detected due to the high-level interferences. This will be explained more in detail referring to FIG. 2.

Figure 2:
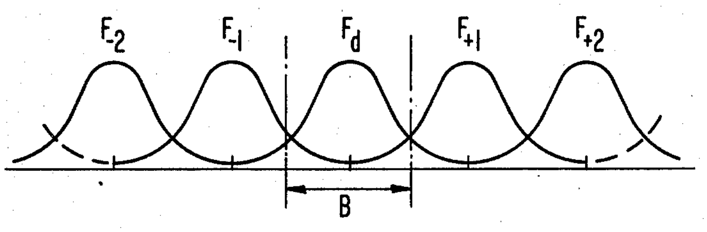
FIG. 2 shows a frequency spectrum of digital-signal-modulated carrier waves travelling through a transmission channel in the frequency division fashion.

In FIG. 2 showing a plurality of carrier waves arranged in the frequency division fashion for the transmission of mutually different digital signals through a common microwave transmission path, *Fd* represents the frequency-domain envelope of the carrier wave under review, while F−1, F−2, —, F+2, —represent carrier waves assigned to adjacent channels, which are modulated with different digital signals, respectively. To make the best use of frequencies, the frequency spacing must be as small as possible. As a result, a part of the spectrum components of carrier waves F−1 and F+1, for example, come to fall in the frequency region of F*d*. These components are undesired interference components when viewed from F*d*. The same applies to other components F−2, F−1, F+1 and F+2 in their relation to their respective adjacent carrier waves. Particularly in the case where the modulating signal is a time-division-multiplexed PCM signal, the ratio of the desired signal level (e.g. F*d*) to the undesired signal level (e.g. F−1 and F+1 ) falling in the frequency band B assigned to the transmission of the desired F*d*, i.e., the so-called desired-to-undesired signal ratio (DU ratio) can be as high as 20dB even under a normal state.

Besides the in-operation and stand-by transmission scheme based on the frequency division technique, there is a similar scheme which resorts to the difference in the plane of polarization of the carrier wave in the microwave frequency region. For such transmission system, the DU ratio is usually around 25dB.

It will be understood from the foregoing description that the efficient use of the limited frequency band which has been achieved by resorting to the modulating by time-division-multiplex digital signals, has resulted in the high undesired signal level under the normal state.

It follows therefore that possible faults in the respective repeater amplifiers at the relay equipment or relay station can no longer be detected since the interference components exist whose levels are much higher than those attributed to the breakdown of the relay amplifiers. This makes it impossible to distinguish the temporary but extensive fault due to fading and the like from those attributed to power breakdown and the like.

The present invention is therefore aimed at providing an effective system for distinguishing such extensive transmission channel faults as those due to fading and the like from local channel faults attributed to local power breakdown and the like at one or more of the microwave relay equipments, thereby to make the number of the stand-by channels as small as possible.

The principle of the invention will now be described in greater detail referring to FIG. 3.

Figure 3:
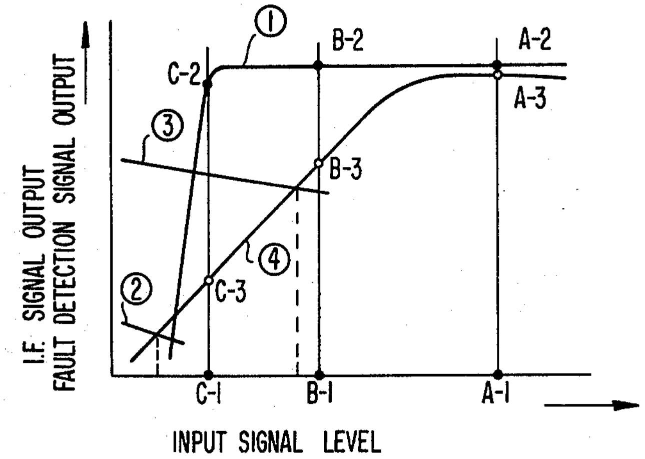
FIG. 3 shows characteristic curves for illustrating the switch-over level selected in the present system.

In FIG. 3, the input signal level to a particular microwaver relay equipment (or station) is given on the abscissa, while the ordinate shows both the intermediate frequency (*i-f*) signal output level at that relay equipment and the fault detection signal output level. Curve 1 shows the relation between the output of the automatic-gain-controlled *i-f* amplifier of that particular relay equipment and the input threrto, with the former taken along the ordinate and the latter taken along the abiscissa. Likewise, curve 2 shows the noise power level vs. input signal level characteristics dependent on the noise index peculiar to that particular relay equipment measured at the fault detection signal monitoring point of that equipment (while the noise includes those already included in the incoming signal at the input of that particular relay equipment and other components generated within the relay equipment, it is assumed here for simplicity of description that all the noise components are in the incoming signal and dependent on the incoming signal level). Curve 3 shows the variation in the fault detection signal level representative of the level of interference components appearing between carrier waves F−1 and F+1 or between the polarization-division carrier waves. Curve 4 shows the relation between the output level for the fault detection monitoring signal and the input signal at the AGC signal amplifier, which varies depending on the input signal level of the repeater.

Figure 4:
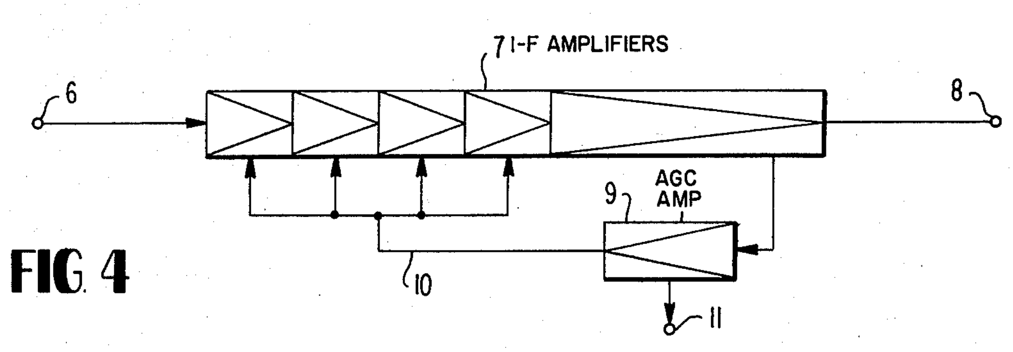
FIG. 4 schematically shows the means for monitoring the incoming signal level.

For incoming signal detection, use may be made of the AGC circuit disposed at each relay equipment (or station) as shown in FIG. 4.

In FIG. 4, the reference numeral 6 represents an input terminal; 7, *i-f* amplifiers; 8, an output terminal; 9, AGC signal amplifier; 10, AGC feedback loop; and 11, the output terminal for the monitoring signal representative of the incoming signal level. Referring to both FIGS. 3 and 4, the curve 1 of FIG. 3 is based on the data obtained at terminal 8, while curves 2, 3 and 4 are on those obtained at terminal 11. When viewed from another point of view, curve 1 shows the characteristic for ac components while curves 2, 3 and 4 for dc components. Continuing to refer to FIG. 3, A-1 denotes an incoming signal level under normal state; B-1, a threshold incoming signal level, down to which the desired signal can be distinguished from any interference components represented by curve 3; and C-1, a threshold incoming signal level down to which the system can guarantee the required transmission quality against noise represented by curve 2. A-2, B-2 and C-2 denote normal output levels of *i-f* amplifiers 7 corresponding to A-1, B-1 and C-1, respectively.

A-3, B-3 and C-3 are *i-f* signal levels observed at the terminal 11 under normal state. Apparently they correspond to A-1, B-1 and C-1, respectively. When incoming signal levels are low, the curves 2 and 3 are shown in FIG. 3. This is due to the increase in the automatic gain controlled amplifier.

It will be assumed here for the convenience of explanation that the carrier waves are in the high frequency region and vunerable to rainfall attenuation and the like and that they are modulated by multiplexed digital signals.

As is well known, the carrier waves in such high frequency region tend to suffer a varied attenuation when transmitted through a rainy area. On the other hand, the modulation of such microwave signals by digital signals makes the carrier waves noise and interference-resistant as indicated by the fact that signal transmission of sufficiently high quality is maintained even if the DU ratio is lowered to a value around 20db. This makes it possible to provide a stable transmission circuit which secures the high quality transmission even if the incoming carrier wave undergoes a large level change. With this in view, the level A-1 for the desired carrier wave under normal state is designed to be set at a level higher by several tens of decibles than the lower threshold level C-1, so that the system may withstand the worst possible level lowering attributable to heaviest downpour. It may appear that the adverse effect of such downpour lowering the incoming carrier level beyond the level C-1 can be avoided by the route diversity technique. In the case of digital-signal-modulated microwave transmission, however, the levels on curve 3 becomes considerably higher than the levels on curve 2, since a DU ratio of 20db or more is allowed as pointed out above.

If the conventional fault detection technique is used, the abnormal drop in the incoming signal level attributable to the relay equipment cannot be detected since the fault detection is performed with respect to the level on the curve 3 (FIG. 3. This is due to the fact that the interference component level lies on curve 3 which is close to the normal level A-3 or B-3. As stated before, this makes it impossible to distinguish the above-mentioned extensive channel faults and the local faults. The definite detection of the error rate for the fault-detection digits may be helpful but such system will be very costly to manufacture as stated above.

In the present invention, the incoming signal level is monitored with respect to three reference points A-1, B-1 and C-1, so that the distinction may be given between the extensive channel fault and local channel fault.

More specifically, in the case of the local channel fault, which is often attributable to the malfunction in the amplifiers and the like at the preceding relay equipment (or station), the fault detection reference is set at level B-3. This makes it possible to detect the state where the monitoring signal level at terminal 11 (FIG. 4) is lower than the level B-3. Upon detection, the incoming signal level is compared with that of a neighboring transmission channel in the same transmission route. If the comparison shows that the latter remains in the normal state, only that particular channel in question is switched over to a stand-by channel, which may be either in the same transmission route or in other stand-by routes.

In the case of the extensive channel fault due to heavy rain and the like, all the carrier waves F*d*, $F-_1$, $F_2$, . . . $F+_1$, $F+_2$, . . . suffer the large attenuation, with the result that their levels are lowered to a value far lower than the level B-3. In that event, the system stays as it is as a whole, waiting for the recovery of favorable transmission conditions. Still, the signal transmission should be continued because the interference signals from the neighboring channels $F-_1$ and $F+_1$ are also lowered to a value lower than the levels of $B-_1$ and, therefore, the signal quality of the channel carrier Fd is maintained satisfactorily.

With greater attenuation to make all of the carrier waves lower than the level C-1, all of the monitoring signals will be lowered to a value lower than the level C-3. Thus, the collective switch-over to the channels of another stand-by transmission route to overcome the extensive channel fault is performed.

Thus, the present invention makes it possible to give a greater tolerance to the change in the incoming signal level, thereby to adapt the microwave relay system to the digital signal transmission, making efficient use of in-operation and stand-by channels. This invention is characterized in that the insertion and extraction of digital codes or the detection of the code error rate is not needed for the present system.

Figure 5:
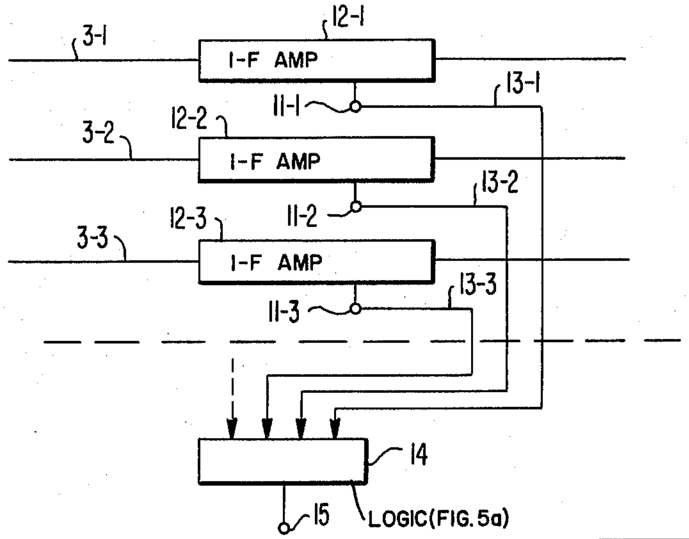
FIG. 5 is a system diagram showing means for discriminating the faults caused in the individual communication channels from those extensive faults common to all the individual channels.
Figure 5A:
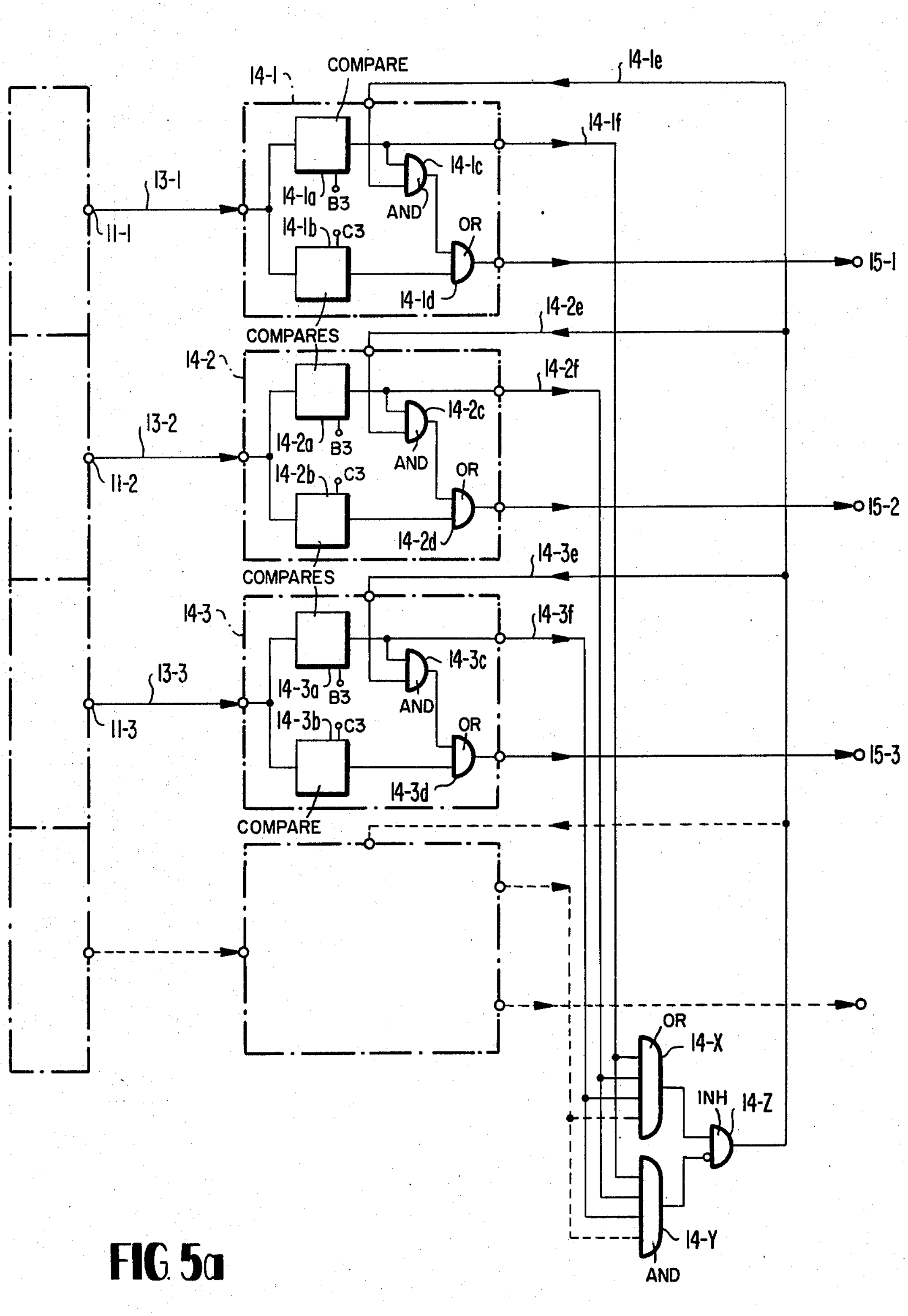
FIG. 5A is a circuit diagram showing an example of the logic circuit employed in the discriminating means for detecting channel faults in FIG. 5.

In FIG. 5, which shows the principal part of an embodiment of the present invention, the reference numerals 12-1, 12-2, 12-3, —denote relay equipment for the transmission channels 3-1, 3-2, 3-3, . . . 13-1, 13-2, 13-3 are the wiring for connecting the incoming signal monitoring output terminals 11-1, 11-2, 11-3, —respectively to a logic circuit 14, which is capable of distinguishing the above-mentioned extensive channel faults and local channel faults on the basis of the incoming signal level monitoring with respect to the reference levels A-3, B-3 and C-3; and 15, an output terminal connecting with the output of the logic circuit 14 for the switch-over control signal. The logic circuit 14 includes a comparator circuit which may be composed of differential amplifiers and other circuit elements manufactured in the form of an IC device such as shown in FIG. 5*a* later mentioned, for example. The switch-over elements may be of any known type.

In operation, if one of the relay amplifiers at a certain relay equipment malfunctions, the monitoring signal level at the monitoring terminal of the relay amplifier concerned comes down to the interference component level B-3. By way of setting the detection level of logic circuit 14 at level B-3, the malfunction in that particular channel is easily detected. If all other channels turned out to be lower than level B-3, it is judged to mean the extensive channel fault. In that event, no switch-over is performed until the lower reference level C-3 is reached by all the incoming signal levels.

In FIG. 5*a* showing an example of the logic circuit 14 shown in FIG. 5, the reference numerals 14-1, 14-2, 14-3, . . . denote logic circuit units respectively corresponding to the relay equipment 12-1, 12-2, 12-3, . . . ; 14-X, an OR-circuit having a plurality of input terminals; 14-Y, an AND-circuit having a plurality of input terminals; 14-Z, an INHIBIT circuit having two input terminals. Further, each of a plurality of the logic circuit units is composed of first comparing circuits **14-1*a*, 14-2*a*, 14-3*a*, . . . for discriminating the difference between the input level and the reference level B-3, second comparing circuits 14-1*b*, 14-2*b*, 14-3*b*, . . . for discriminating the difference between the input level and the reference level C-3, AND-circuits 14-1*c*, 14-2*c*, 14-3*c*, . . . having two input terminals for respectively receiving two coded outputs of the first comparing circuit and the INHI-circuit 14-Z, and OR-circuits 14-1*d*, 14-2*d*, 14-3*d*, . . . having two input terminals for respectively receiving two coded outputs of the second comparing circuit and the AND-circuit. The first comparing circuits are respectively supplied with a reference voltage B-3 from a separate source for comparing, and also the second comparing circuits are supplied with a reference voltage source C-3. In each of the logic circuit units, the inputs of the first and second comparing circuits is respectively supplied through the wiring 13-1, 13-2, 13-3, . . . from the incoming signal monitoring output terminals 11-1, 11-2, 11-3, . . . of the relay equipment. Now if the monitoring signal level of the terminal 11-1 comes down to the reference level B-3, and the other monitoring signal levels are higher than the level B-3 only the output of the first comparing circuit 14-1***a* represents the code "1" and the others denote the code "0". Since each output of a plurality of the first comparing circuits is respectively connected by the wiring 14-1*f*, 14-2*f*, 14-3*f*, . . . to the OR-circuit 14-X and the AND-circuit 14-Y, the output of 14-X becomes "1" and, also, the output of 14-Y becomes "0". Consequently, the INHIBIT-circuit 14-Z receiving the two outputs of 14-X and 14-Y denotes "1" at its output side. Then, the output of the AND-circuit 14-1*c* becomes "1". On the other hand, the output of the second comparing circuits 14-1*b*, 14-2*b*, 14-3*b*, . . . are in the state of "0" because the input signal levels are higher than the reference level C-3. Thus, the OR-circuit 14-1*d* leads the output signal "1" for the switch-over control to the output terminal 15-1.

If all the monitoring signal levels in the terminals 11-1, 11-2, 11-3, . . . come down to the reference level B-3, all the outputs of the first comparing circuits 14-1*a*, 14-2*a*, 14-3*a*, . . . represent "1". The output of the OR-circuit 14-X becomes "1" and, also, the output of the AND-circuit 14-Y becomes "1". Consequently, the INHI-circuit 14-*z* denots "0" at its output side. Then, the outputs of the AND-circuits 14-1*c*, 14-2*c*, 14-3*c*, . . . become all "0" and, therefore, the output signal of the OR-circuits 14-1*d*, 14-2*d*, 14-3*d*, . . . hold "0" as it is. Thereby, it will be shown that the output signal ("1") for the switch-over control does not appear at any of the output terminals 15-1, 15-2, 15-3, . . . . In the case of extensive channel faults caused by heavy rain and the like, such as the one mentioned above, the system preferably waits for the recovery of favorable transmission conditions.

If the monitoring signal level comes down to the reference level C-3, it will be understood that the OR-circuit of its logic circuit unit provides the output signal "1" for the switch-over control to the output terminal.

Figure 6:
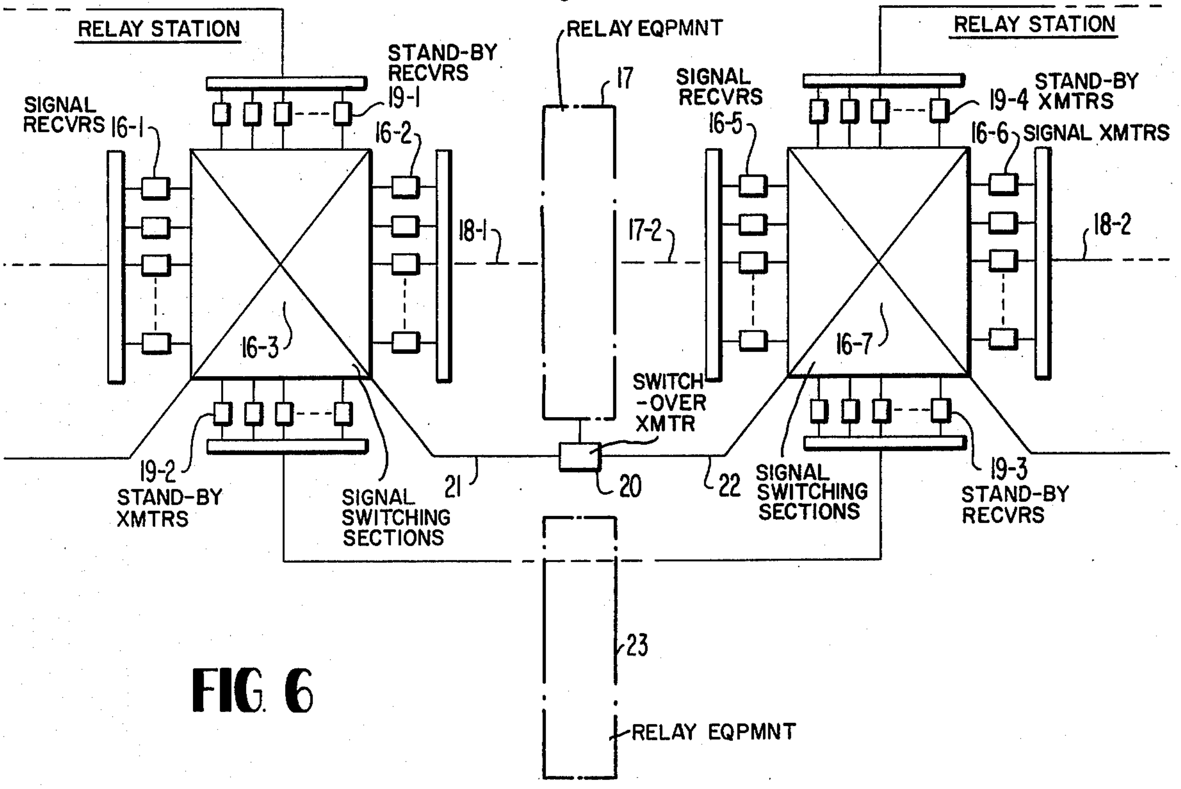
FIG. 6 shows a schematic diagram showing the switch-over system for the channel-to-channel to the route-to-route switch-over.

In FIG. 6, which shows how the present fault detection system is applied to the switch-over from in-operation channels to stand-by channels and vice versa, the reference numerals 16-1, 16-2 and 16-3 denote the signal receiver, the signal transmitter and the switching sections of the relay stations having the switch-over function; 16-5, 16-6 and 16-7 are those elements of another relay station corresponding to 16-1, 16-2 and 16-3; 17, intermediate relay equipment of the inoperative transmission route disposed between those relay stations; 18-1 and 18-2, inoperative transmission lines; 19-1 and 19-3, the signal receivers similar to 16-1 and 16-5 provided channels of the stand-by transmission route; 19-2 and 19-4, the signal transmitter sections similar to 16-2 and 16-6 provided for channels of the stand-by transmission route; 20, transmitter section for the switch-over control signal supplied with the output from the terminal 15 (FIG. 5), which section in this embodiment is composed of the detector circuit of FIG. 5 disposed at the intermediate relay equipment; 21 and 22, switch-over control signal transmission channels for supplying the same to the transmission section and the relay stations; and 23, intermediate relay equipment in the stand-by transmission route.

Referring to FIGS. 5 and 6, the switch-over control signal obtained at the logic circuit 14 is supplied through terminal 15, control signal transmitter circuit 20, and transmission lines 21 and 22, to the switching sections 16-3 and 16-7. In the case of the local channel fault, the switch-over is performed for transferring the fault channel to the stand-by channels included in the in-operation transmission line. If the extensive channel fault extending to those portions common to a plurality of channels is detected, the receiver sections 16-3 and 16-7 effect the collective switch-over to the transmission of the stand-by route from the in-operation route channels, in response to the switch-over control signal supplied from terminal 15 through the transmitter 20.

While the system of FIG. 6 assumes that the incoming signal level detection circuit is disposed at one of the intermediate relay equipment, it will be apparent that it may be in the relay stations capable of the switch-over function or in every one of the relay equipment and stations, depending on the demand for the system. Likewise, the coupling of the relay equipment 12-1, 12-2 and 12-3 with the logic circuit 14 may be made by digital signals, which designate whether the incoming signal level is lower than level B-3 or C-3 in the digital form. Also, the incoming signal level monitoring with respect to the level A-3 may be dispensed with.

It will be apparent that the foregoing description has been made by way of example and not as a limitation to the scope of the invention as defined in the appended claims.

What is claimed is:

1. In a digital transmission system comprising a plurality of relay stations each receiving a plurality of signal channels in parallel, a method for detecting channel faults comprising the steps of:

a. determining a first reference level corresponding to the level of interference signals expected on a channel from neighboring channels, b. determining a second reference level corresponding to the noise signal level on each channel caused by the circuit components in each channel and c. at least one relay station, monitoring the incoming signal level for each channel with respect to said first and second reference levels to develop an indication of a fault.

2. The method of claim 1 wherein said monitoring step includes the step of detecting in each channel if the level of the incoming signal is higher than said first reference level or lies between said first and second reference levels or is lower than said second reference level.

3. The method of claim 2 further including the step of switching at least one signal channel to a stand-by channel of said plurality of signal channels when the incoming signal of said at least one channel falls below said first reference level when it is detected that the incoming signal levels of any other channel is higher than said first reference level.

4. The method of claim 2 further including the step of switching at least one signal channel to a stand-by channel of said plurality of signal channels when the incoming signal of said at least one channel falls below said second reference level even if it is detected that the income signal levels of all other channels have fallen between said first and second reference levels caused by extensive channel faults.

* * * * *

UNITED STATES PATENT AND TRADEMARK OFFICE

CERTIFICATE OF CORRECTION

PATENT NO. : 3,882,456

DATED : May 6, 1975

INVENTOR(S) : Masami TAKADA

It is certified that error appears in the above-identified patent and that said Letters Patent are hereby corrected as shown below:

IN THE SPECIFICATION:

Column 1, line 24 - delete "inoperation" and insert -- in-operation --

Column 2, line 7 - delete "1-1, 1-2, 2, —" and insert -- 1-1, 1-2, — -- line 9 - delete "2-1, 3-2, —," and insert -- 2-1, 2-2, —. -- line 22 - after "on another" insert -- transmission --

Column 3, line 10 - after "systems" insert -- , -- line 54 - delete "modulating" and insert -- modulation --

Column 4, lines 8-9 - delete "microwaver" and insert -- microwave -- line 15 - delete "threrto" and insert -- thereto -- line 17 - delete "abiscissa" and insert -- abscissa --

Column 5, line 24 - delete "becomes" and insert -- become -- line 31 - after "(Fig. 3" insert -- ) -- line 61 - delete "$F_2$," and insert -- $F_{-2}$, --

UNITED STATES PATENT AND TRADEMARK OFFICE

CERTIFICATE OF CORRECTION

PATENT NO. : 3,882,456

DATED : May 6, 1975

INVENTOR(S) : Masami TAKADA

It is certified that error appears in the above-identified patent and that said Letters Patent are hereby corrected as shown below:

IN THE SPECIFICATIONS (Continued)

Column 6, line 20 - after "3-3, ..." insert -- ; --

Column 8, line 14 - after "sion" insert -- channels -- line 15 - before ", in response" delete "channels"

IN THE CLAIMS:

Column 8, line 44 - after "c." and before "at least" insert -- at -- line 65 - delete "income" and insert -- incoming --

Signed and Sealed this

*fifth* Day of *August 1975*

[SEAL]

*Attest:*

RUTH C. MASON
*Attesting Officer*

C. MARSHALL DANN
*Commissioner of Patents and Trademarks*